Jan. 11, 1938. G. A. PAULIN 2,105,293
CONVERTIBLE BODY FOR VEHICLES, AND PARTICULARLY FOR MOTOR VEHICLES
Filed Jan. 11, 1934   5 Sheets-Sheet 1
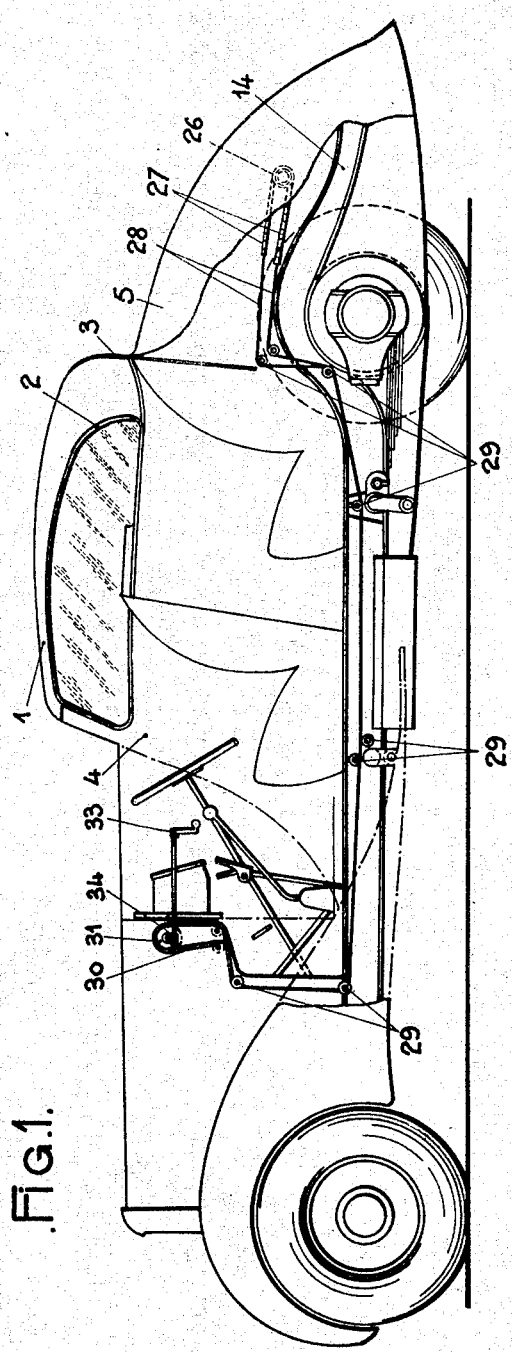
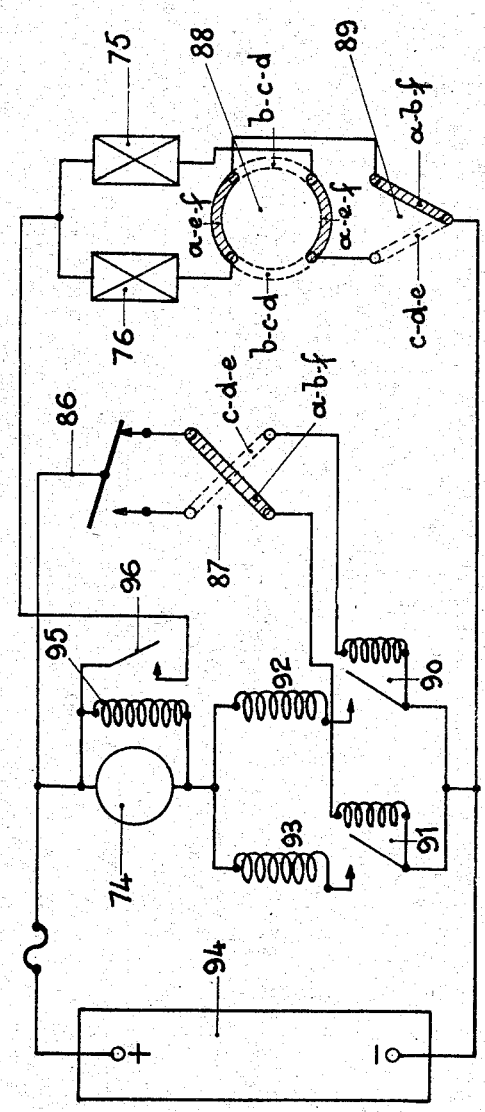

Jan. 11, 1938.  G. A. PAULIN  2,105,293
CONVERTIBLE BODY FOR VEHICLES, AND PARTICULARLY FOR MOTOR VEHICLES
Filed Jan. 11, 1934   5 Sheets-Sheet 3
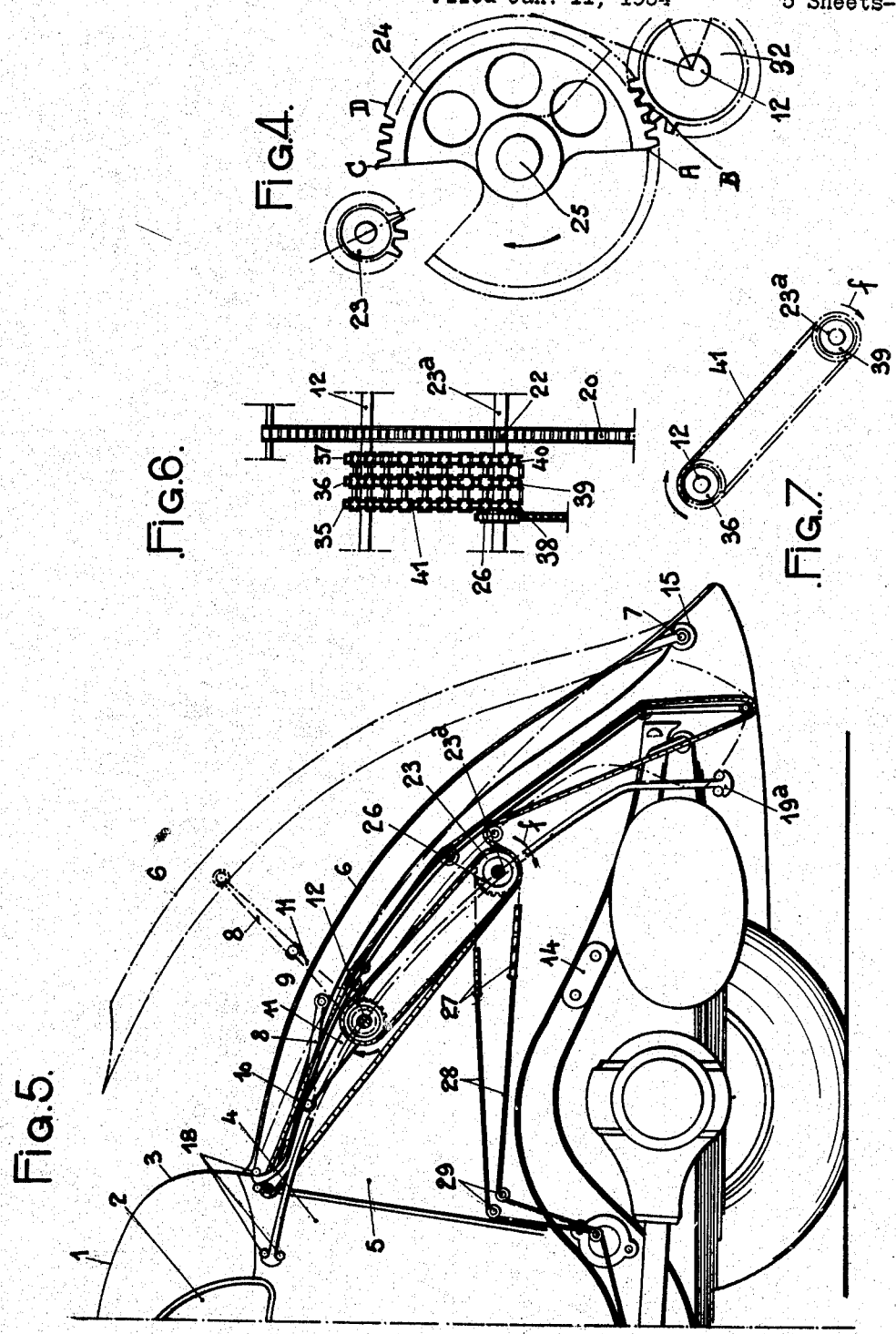

Jan. 11, 1938. G. A. PAULIN 2,105,293
CONVERTIBLE BODY FOR VEHICLES, AND PARTICULARLY FOR MOTOR VEHICLES
Filed Jan. 11, 1934 5 Sheets-Sheet 4
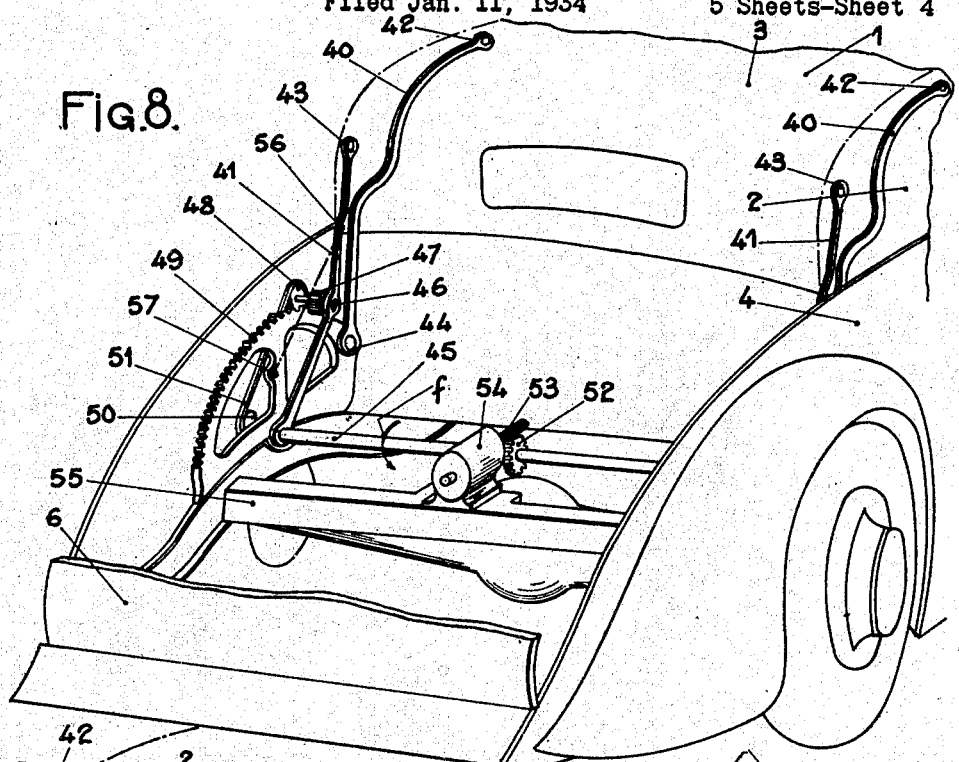
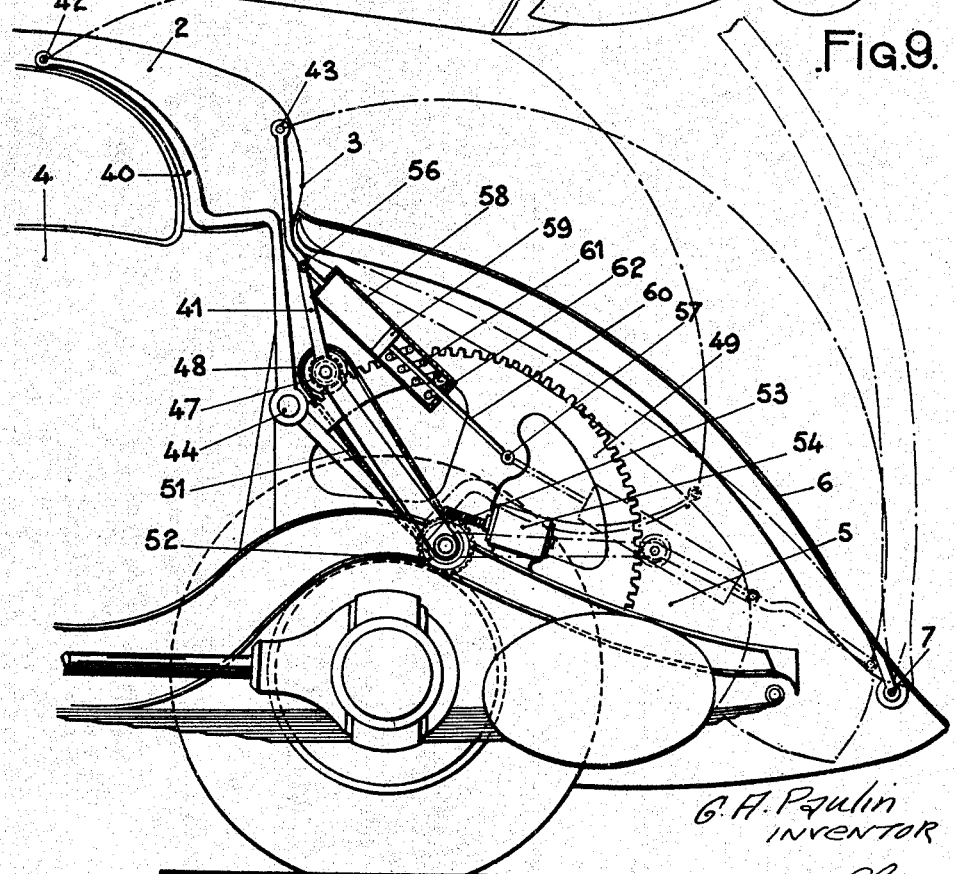

Jan. 11, 1938.    G. A. PAULIN    2,105,293
CONVERTIBLE BODY FOR VEHICLES, AND PARTICULARLY FOR MOTOR VEHICLES
Filed Jan. 11, 1934    5 Sheets-Sheet 5
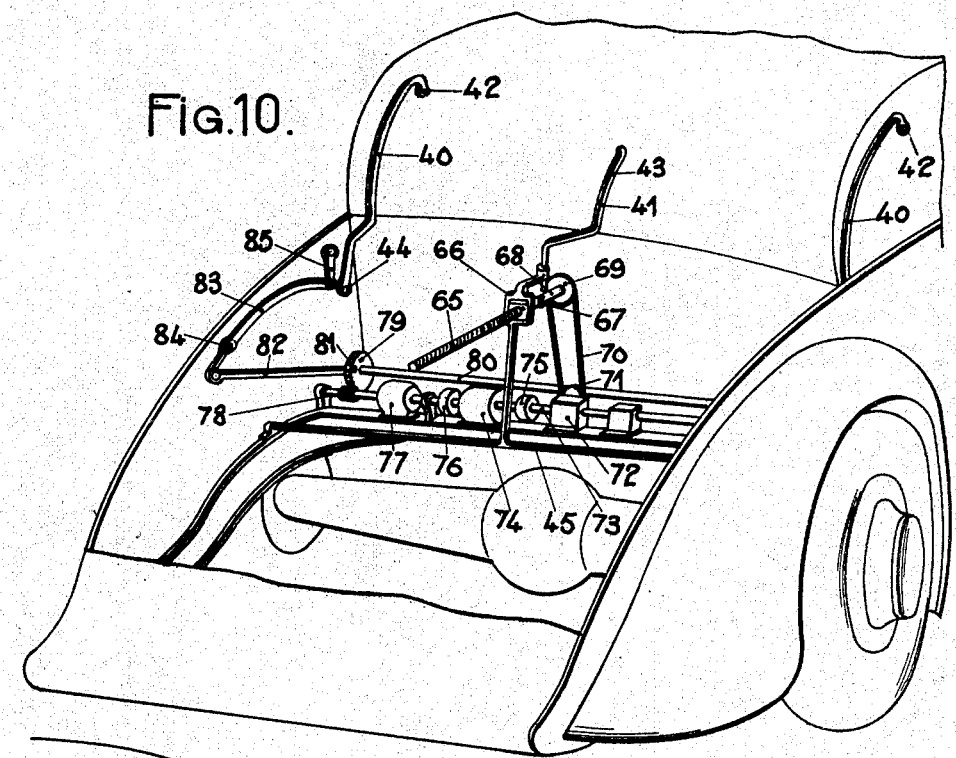
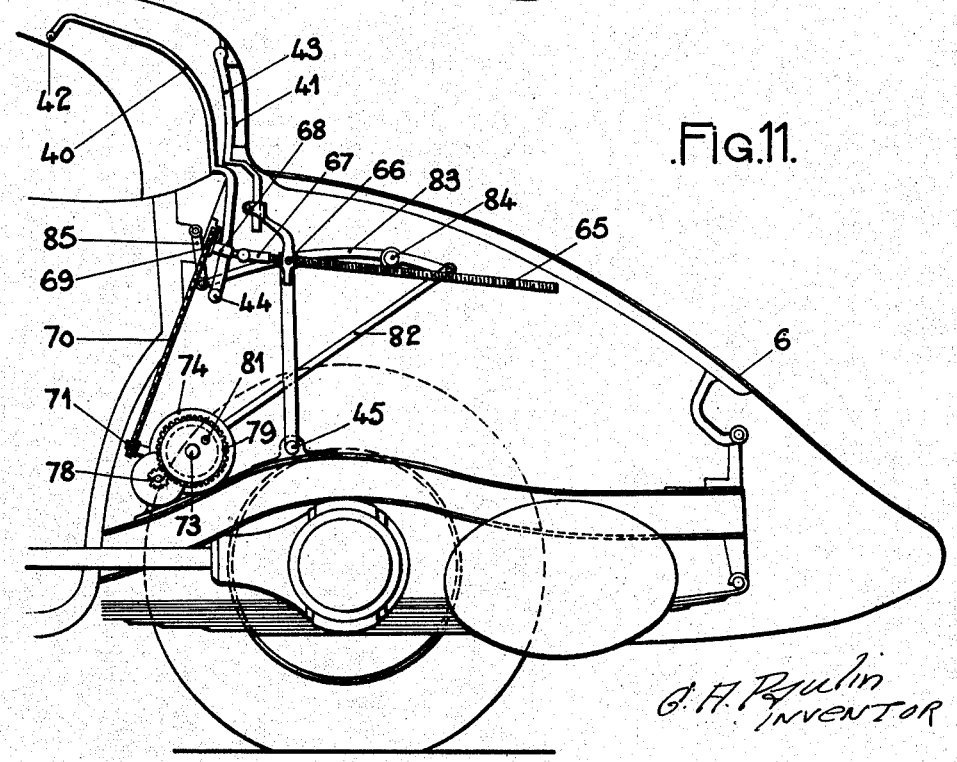

Patented Jan. 11, 1938

2,105,293

UNITED STATES PATENT OFFICE 2,105,293

CONVERTIBLE BODY FOR VEHICLES, AND PARTICULARLY FOR MOTOR VEHICLES

Georges Auguste Paulin, Malakoff, France

Application January 11, 1934, Serial No. 706,279
In France January 18, 1933

8 Claims. (Cl. 296—107)

The present invention relates to improvements in convertible bodies for vehicles, characterized in that the movable portion of the car body, constituted by the roof and the side portions rigid with this roof forming a rigid unit, is movable in translation in order to be withdrawn within a receptacle or spider placed at the rear of the car body.

The accompanying drawings, given by way of example only, illustrate some forms of construction of a convertible body according to the invention.

Fig. 1 is an elevation, partly in section, of a car having a convertible body, and shows a form of construction of the control for the shaft actuating the various parts.

Fig. 4 is a detail view, on an enlarged scale, showing the device for controlling the actuation of the cover of the spider and of the movable portion of the car body.

Fig. 5 is a section of a constructional modification of the members for actuating the cover of the spider and for stowing away the movable portion of the car body.

Fig. 6 is a partial side view of Fig. 5 seen from the rear.

Fig. 7 is a detail view of the actuating device comprising a gapped chain and illustrated in Figs. 5 and 6.

Fig. 8 is a perspective view of another form of construction of the device controlling the actuation of the movable portion of the car body, the shock absorbing device being removed.

Fig. 9 is a longitudinal section thereof.

Fig. 10 is a perspective view of a constructional modification of the form of construction illustrated in Figs. 8 and 9.

Fig. 11 is a sectional view thereof.

Fig. 12 is a diagram of the electric connections.

Figure 3:
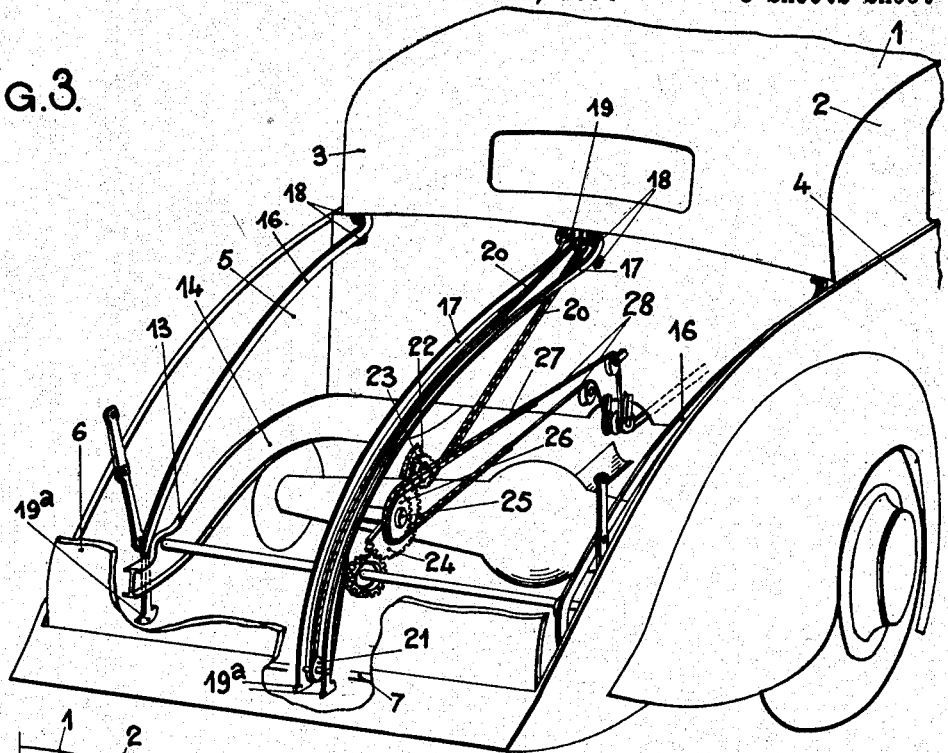
Fig. 3 is a perspective view of the vehicle seen from the rear, the cover of the spider being removed.
Figure 2:
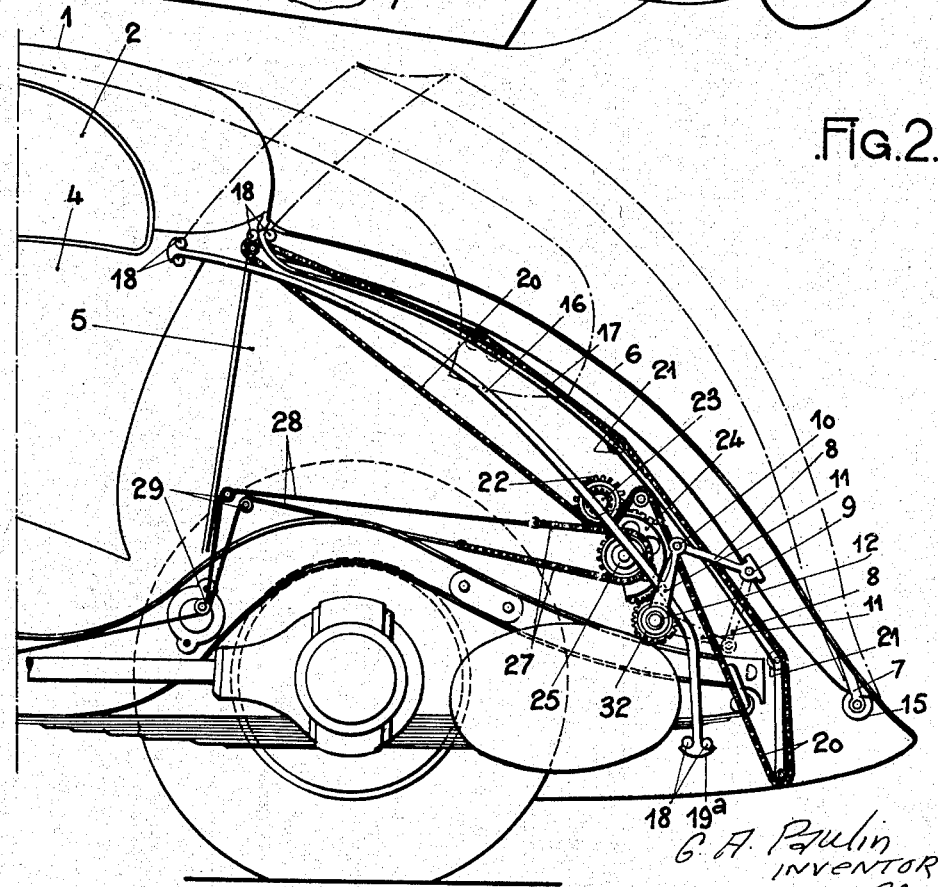
Fig. 2 is a detail sectional view showing a first form of construction of the parts for actuating the cover of the spider and for stowing away the movable portion of the car body.

In the form of construction illustrated in Figs. 1, 2, 3, and 4, the movable portion 1 of the car body comprises the roof proper, as well as the side portions 2 and the rear portion 3 situated above the body proper 4 of the car body. The spider or rear receptacle 5 is normally closed by a cover 6 pivoted about a shaft 7 parallel to the axis of the axles of the vehicle. The cover 6 is lifted by means of two series of links arranged on the sides of the cover. The link 8 is pivotally connected, on the one hand, at 9, to the cover 6 and, on the other hand, to the end 10 of another link 11 which is angularly secured on a shaft 12 supported by bearings 13 attached to the longitudinal bearers 14 of the chassis of the vehicle for instance. Springs 15, arranged about the shaft 7 on which the spider cover is pivoted or at any other suitable place (on the pivot pins of the links for instance) tend to move the cover 6 down in order to close the spider. Side guide inclines 16 and central guide inclines 17 are secured to the car body 4 and to the longitudinal bearers 14 of the vehicle for instance. Rollers 18 are loosely mounted on pins secured on lugs 19 rigid with the rear part 3 of the withdrawable portion 1 of the car body and are so arranged as to respectively roll on the upper and lower faces of the guide inclines 16 and 17. These inclines 16 and 17 have corresponding profiles so designed that the withdrawable portion 1 of the car body moves into the spider 5 of the vehicle. The relative position of the various rollers 18 respectively rolling on the side and central inclines 16 and 17, is such that this movable portion 1 is at every movement perfectly guided and held without risk of rocking. Abutments can be provided at the end of the displacement for supporting the movable portion when it is in position in the spider, so as to prevent this movable portion from being supported solely by the guide inclines 16 and 17 when the vehicle is running. Abutments 19ª are moreover provided at the lower end of the inclines 16 and 17 for the rollers 18. The withdrawable portion 1 of the car body is moved for instance by means of a chain 20 rendered rigid with said movable portion 1 and moving parallel to the tracks. This chain 20 is guided by rollers or pinions 21 loosely mounted on spindles secured to the central guide inclines 17. This chain 20 meshes with a pinion 22 rigid with a toothed pinion 23 which meshes with a toothed segment 24 movable on a shaft 25 journalled in suitable brackets or bearings supported by the chassis or other fixed part of the vehicle. A sprocket wheel 26, rigid with a toothed segment 24, is driven by a chain 27 the ends of which are attached, in the example illustrated, to the ends of cables 28. These cables are guided by rollers 29 and their displacement is controlled by any suitable means. For instance, the free ends of the cable are attached to a chain 30 meshing with a pinion 31 rotatively driven through the medium of a crank 33 and of a worm and worm wheel gearing down device 34. Use could also be made of an electric motor or of the engine of the car utilizing a reversing gear and moreover, when the engine of the car is used, a suitable clutch.

A toothed pinion 32 is rigidly secured on the shaft 12 actuating the links lifting the cover, this pinion 32 meshing with the toothed segment 24. Assuming the toothed segment is in gear with the pinion 32, as shown in Fig. 4, it will be seen that if, as indicated above, the toothed segment 24 is caused to rotate through a sufficient amplitude A B for determining a suitable rotation of the shaft 12 and, consequently, of the links 8 and 11, the cover 6 lifts and opens the spider 5. During this first movement and owing to the arrangement of the toothed segment 24, the pinion 23 is not rotatively driven and, consequently, the movable portion 1 of the car body remains in position. At the end of this movement, the toothed segment meshes with the pinion 23. During the second movement having an amplitude B C, this pinion 23 is rotatively driven and, as explained above, it causes the movable portion 1 to be withdrawn within the spider 5. At the end of this movement, the toothed segment 24 again comes in engagement with the pinion 23 and a rotation of this segment having amplitude $CD=AB$ causes the spider to be closed. The links 8 and 11 move to the position indicated in dotted lines in Fig. 2 of the drawings, if it is assumed that they were at the beginning in the position indicated in full lines. A rotation of the toothed segment 24 in the reverse direction, causes a similar operation: opening of the spider, replacing of the movable portion 1 in position on the car body, closing of the spider.

In the form of construction of the control device illustrated in Figs. 5, 6 and 7, the principle of the device remains the same, alone the arrangement and the mode of actuation of the various members are different. The shaft 12 controlling the movement of the cover 6 of the spider 5 is placed near the end of this cover, or, in other words, at the upper part of the spider 5. The arrangement of the links 8 and 11 remains the same as previously, with the exception that the length of the links is greater for an equal lift of the cover 6. The sprocket wheel 26 is loosed on the shaft 23a carrying the pinion 22 in engagement with the chain 20 actuating the movable portion 1. Each of the shafts 12 and 23a carry three pinions (35, 36, and 37 for the shafts 12, 38, 39, and 40 for the shaft 23a, arranged opposite each other). The pinions 35, 37, 38, and 40 are loosely mounted on their respective shafts, but the pinion 38 is rendered rigid with the sprocket wheel 26; the pinions 36 and 39 are secured on the shafts 12 and 23a, respectively. On both these series of pinions is mounted a chain 41, the middle stretch or length of which, in engagement with the pinions 36 and 39, is gapped so that it is in engagement at any moment with but one of these pinions (Fig. 7). When the pinion 38 is driven through the medium of the sprocket wheel 26 in the direction of the arrow f, it drives the chain 41 which causes the pinion 36 to rotate through a sufficient amplitude for causing the cover 6 of the spider to lift; the chain 41 then comes in engagement with the pinion 39 which it actuates for determining the displacement of the movable portion of the car body, then it again actuates the pinion 36 for closing the spider. An operation in the reverse direction produces a similar result, viz: opening of the spider, replacement of the movable portion on to the vehicle body, closing of the spider.

In the form of construction illustrated in Figs. 8 and 9, alone the means used for the displacement of the movable portion 1 and the parts of the mechanism located on one side of the car will be described, and it is to be understood that these parts are duplicated on the other side of the car.

Two rigid levers 40 and 41 are respectively pivoted on the one hand, at 42 and 43, on the side wall 2 of the roof and, on the other hand, to a fixed point 44 of the car body and about a shaft 45. The points 42, 43, 44, and 45 constitute the apices of a four-bar motion. In case the displacement of the roof is a geometrical translation, this four-bar motion becomes a parallel motion, but, in practice, and owing to the shape and arrangement of the spider, it is necessary that the roof should slightly rock backwards (the word "translation" being taken in a broader sense than its purely geometrical sense), so that the points 42, 43, 44 and 45 must be slightly displaced relatively to the apices of the parallel motion.

A pivot pin 46 is secured on the lever 41 at an intermediate point thereof, and on this pivot pin is loosely mounted a toothed pinion 47 rigid with a sprocket wheel 48. The toothed pinion 47 meshes with a fixed toothed segment 49. A sprocket wheel 50, rigidly secured on the end of the shaft 45, rotatively drives, through the medium of a chain 51, the sprocket wheel 48 and, consequently, the pinion 47. On the shaft 45 is rigidly secured a worm wheel 52 meshing with a worm 53 fast on the shaft of an electric motor 54 mounted on a cross member 55 of the vehicle frame for instance.

A shock absorbing device is mounted between a point 56 situated on one of the levers and a fixed point 57 of the car body or other fixed part. This shock absorbing device is constituted by a cylinder 58 pivoted at 56 on the lever 41, and in which moves a piston 59 the rod 60 of which is pivoted at a fixed point 57. A spring 61 is interposed between the piston 59 and the rear head 62 of the cylinder adjacent to the pivot point 57. It will be seen that, in this manner, when the roof is: either in position on the car body as shown in full lines in Fig. 2, or within the spider as shown in dot and dash lines in this figure, the spring 61 is compressed and, consequently, tends to promote the displacement of said roof at the beginning of the movement.

The operation of the device according to the invention is as follows: the motor 54 can rotate in both directions and a suitable control device is provided for controlling this direction of rotation according to the position of the movable roof 1. Assuming the roof is in position on the car body, the motor is started for driving the shaft 45 in the direction of the arrow f, the sprocket wheel 48 rotates in the same direction and it will be seen that the lever 41 rotates in a clockwise direction, actuating the roof 1 in order to insert it in the spider.

By causing the motor 54 to rotate in the reverse direction, the movable roof is restored on to the car body. It is obvious that the device for automatically reversing the direction of displacement at the extreme positions can be of any type without departing from the scope of the invention.

In the form of construction illustrated in Figs. 10 and 11, the displacement of the roof is also obtained by means of levers 40 and 41 the pivot points 42, 44 and 43, 45 of which constitute the apices of a four-bar motion. But, in this form of construction, one of the groups of levers comprises a single lever 41 which is arranged in the transverse axis of the movable part 1 and the operating means act on this single lever. These operating means are constituted by a screw-threaded spindle 65, which can rotate but is prevented from axially moving. This screw-threaded spindle 65 passes through a nut 66 pivotally mounted on the median lever 41. The spindle 65 is mounted, through the medium of a Cardan joint 67, at the end of a shaft 68, on the other end of which a sprocket wheel 69 is keyed. This sprocket wheel 69 is rotatively driven by a chain 70 passing over another sprocket wheel 71 rigidly secured on the secondary shaft of a suitable speed reducing device 72. The primary shaft 73 of this speed reducing device is driven by an electric motor 74 having two windings 92 and 93, through the medium of a magnetic clutch 75.

The electric motor 74 rotating in both directions, controls, on the one hand, through the medium of a magnetic clutch 76 and of a speed reducing device 77, a toothed pinion 78 meshing with a toothed wheel 79. This wheel 79 is rigidly secured on a shaft 80. This shaft 80, which extends throughout the width of the car body, carries, at each of its ends, a crank plate, one of which can be constituted, as illustrated in Figs. 10 and 11, by the toothed wheel 79. Each of these crank plates carries a crank pin 81 to which is pivotally connected a link 82, the other end of which is pivotally connected to the end of a lever 83 pivoted at 84 on the body proper 4 of the car body. The other end of the lever 83 is pivotally connected to the cover 6 of the spider through the medium of a link 85. A manual reverser 86 and three automatic reversers 87, 88 and 89 are provided for automatically effecting the following successive operations, it being assumed that the motor is rotating in the suitable direction:

1. Lifting of the cover 6 of the spider 5 by putting the magnetic clutch 76 in action and putting the magnetic clutch 75 out of action.

2. Insertion of the movable portion 1 of the roof into the spider 5 by putting the magnetic clutch 76 out of action and putting the magnetic clutch 75 in action.

3. Lowering of the cover 6 of the spider 5 by putting the magnetic clutch 75 out of action and setting the magnetic clutch 76 in action.

4. Automatic opening of the circuit feeding the electric motor 74 and changing the connections of the circuit of this motor for causing it to rotate in reverse direction during the following working cycle which will occur when the user will again close the circuit feeding said motor 74. This new working cycle produces the same operations as in the previous case, with the exception that the insertion of the movable portion 1 into the spider is replaced by the displacement of this movable portion 1 from the spider on to the body 4 of the vehicle.

An embodiment of these electric circuits is illustrated, by way of example, in Fig. 12 in which the same reference number designates the same parts as in Figs. 10 and 11. The automatic reverser 87, or general end reverser, changes the direction of rotation of the motor 74 by closing, by means of relay 90 or 91, either of the circuits of the inductors 92 and 93, the operation of the reverser taking place at the end of the closing movement of the cover 6 of the spider. This reverser 87 is in series across the two circuits extending from the contact pieces of the two-direction manual reverser 86, the other contact piece of which is connected to the positive pole of a source of current supply 94.

The reversers 88 and 89 are both in series across the two circuits connected in parallel of the magnetic clutches 75 and 76, these two circuits being controlled, on the other hand, by a contact 96 actuated by an electromagnet the winding 95 of which is in shunt at the terminals of the armature of the motor 74, so that the contact 96 is closed when the motor 74 rotates.

The reverser 88 operates at the end of the opening movement of the cover 6 of the spider, whilst the reverser 89 operates at the end of the displacement of the movable portion 1 of the car body.

Assuming the car is covered by the movable portion 1, the following operations are effected:

(a) Openings of the spider, the reverser 88 operates.

(b) Displacement of the movable portion 1 for inserting it into the spider, the reverser 89 operates.

(c) Closing of the spider, the reverser 87 operates, then by operating the manual reverser 86, the following operations are effected;

(d) Opening of the spider, the reverser 88 operates.

(e) Displacement of the movable portion 1 for resetting it in position on the body proper of the car body, the reverser 89 operates.

(f) Closing of the spider, the reverser 87 operates.

The letters indicated on the diagram correspond to the position of the reversers during the operations mentioned above and indicated by the same letters.

It is obvious that this diagram has been given only by way of example; the operation of the automatic reversers can be controlled either from the shafts controlling the movement of the cover of the spider and the movement of the movable portion 1 of the car body, or from the movable members themselves.

In the various forms of construction, resilient devices can be provided for checking the movement of the movable portion 1 when it is inserted into the spider 5, these resilient devices assisting the movement when the movable portion 1 is reset in position on the body proper 4 of the car body, as shown in particular in Fig. 9.

Suitable locking devices, of known type, can be provided for securing the movable portion 1 of the car body to the posts of the front glass plate for instance and, in case said movable portion 1 is actuated by means of an electric motor, a switch for controlling the circuit of said motor is combined with these securing means in order to avoid any faulty operation and to automatically open the circuit of the motor when these locking devices are in action; said switch (not shown) will be connected in series for instance to the circuit of the manual reverser 86 between the latter and the source of current supply 94.

Stress limiting devices can also be provided on the control members in order to avoid breaking the same in case of faulty operation.

Suitable devices for ensuring fluid-tightness are provided in order to avoid any admission of water at the joints between the movable portion 1 and the body proper 4 of the car body for instance.

What I claim as my invention and desire to secure by Letters Patent is:

1. In a vehicle having a movable rigid roof capable of being withdrawn within a receptacle or spider formed in the fixed part of the car body and provided with a cover closing the said spider when the vehicle is hooded or unhooded, in combination, two first links arranged on each side of the said roof, a second link arranged in the transverse axis of the said roof, these links being pivoted on the one hand to the said roof and on the other hand to the fixed part of the car body, the four pivots of the two first links and of the second link constituting the apices of a four-bar motion, a nut articulated to the said second link, a screw axially moving and engaging in the said nut, first means for rotating the said screw and second means for operating the said cover when it is desired to insert the roof in the said spider or when it is desired to remove it therefrom, the said means being controlled from the same source of power.

2. In a vehicle having a movable rigid roof capable of being withdrawn within a receptacle or spider formed in the fixed part of the car body and provided with a cover closing the said spider when the vehicle is hooded or unhooded, in combination, two first links arranged on each side of the said roof, a second link arranged in the transverse axis of the said roof, these links being pivoted on the one hand to the said roof and on the other hand to the fixed part of the car body, the four pivots of the two first links and of the second link constituting the apices of a four-bar motion, a nut articulated to the said second link, a screw axially moving and engaging in the said nut, first means for rotating the said screw and second means for operating the said cover of the spider when it is desired to insert the roof in the said spider or when it is desired to remove it therefrom, an electric motor having two windings actuating the said means and magnetic clutches actuated separately so that the said motor actuates the first or the second means, the said clutches being automatically controlled by the said roof and the said cover of the spider.

3. In a vehicle, in combination, a chassis, a body thereon, a movable rigid roof of a single piece for the body, a receptacle at the rear of the body and also supported by the chassis, means within the receptacle for constantly supporting and guiding the roof body bodily in a vertically curved path from an upright position on top of the body to a lowered but substantially upright position within the receptacle or vice versa, and means for actuating said supporting and guiding means.

4. In a vehicle, in combination a chassis, a body thereon, a movable rigid roof of a single piece for the body, a receptacle at the rear of the body and also supported by the chassis, a cover pivoted to the lower end of the receptacle for normally closing the receptacle, means within the receptacle for constantly supporting and guiding the roof body bodily in a vertically curved path from an upright position on top of the body to a lowered but substantially upright position within the receptacle or vice versa, means for swingably connecting the lower edge of the cover to the lower part of the receptacle so that it may be swung to an open or closed position, main operating means, and control means actuated by the operating means and associated with the roof supporting means and the cover swinging means for simultaneously operating both of the latter means in timed relation with respect to each other.

5. In a vehicle, in combination a chassis, a body thereon, a movable rigid roof constructed in a single piece for association with the body, a receptacle at the rear of the body, an operative connection within the receptacle and between the rigid roof and the receptacle for constantly supporting and guiding the roof bodily in a vertically curved path from its normal upright position on top of the body to a lowered but substantially upright position within the receptacle or vice versa, and a cover for normally closing the receptacle and mounted so as to be raised and lowered during the insertion and removal of the roof with respect to the receptacle.

6. In a vehicle having a movable rigid roof of a single piece capable of being withdrawn within a receptacle or spider formed in the fixed part of the car body and provided with a cover closing the said spider when the vehicle is hooded or unhooded, in combination, two groups of two links arranged on each side of the said roof, the two links of each group being pivoted on the one hand to the said roof and on the other hand to the said fixed part of the car body, the four pivots constituting the apices of a four-bar motion, means for causing the rotation of at least one link of each of the groups, means for operating the said cover of the spider when it is desired to insert the roof in the said spider or when it is desired to remove it therefrom, main drive means, and control means operated by the main drive means and operatively connected with both of said operating means for actuating said means synchronously.

7. In a vehicle having a movable rigid roof capable of being withdrawn within a receptacle or spider formed in the fixed part of the car body and provided with a cover closing the said spider when the vehicle is hooded or unhooded, in combination, two groups of two links arranged on each side of the said roof, the two links of each group being pivoted on the one hand to the said roof and on the other hand to the said fixed part of the car body, the four pivots constituting the apices of a four-bar motion, a pivot rigid with a link of each group of two links, a toothed pinion loosely mounted on the said pivot, a first pinion with chain rigid with the said toothed pinion, a second pinion with chain, a chain connecting the said pinions with chain, an electric motor driving said second pinion with chain, a toothed segment rigid with the fixed part of the car body and with which meshes the said toothed pinion, means for operating the said cover of the spider when it is desired to insert the roof in the said spider or when it is desired to remove it therefrom, the said means being controlled from the same source of power.

8. In a vehicle having a movable rigid roof of a single piece capable of being withdrawn within a receptacle or spider formed in the fixed part of the car body and provided with a cover closing the said spider when the vehicle is hooded or unhooded, in combination, two first links arranged on each side of the said roof, a second link arranged in the transverse axis of the said roof, these links being pivoted on the one hand to the said roof and on the other hand to the fixed part of the car body, the four pivots of the two first links and of the second link constituting the apices of a four-bar motion, means for causing the rotation of the said second link, means for operating the said cover of the spider when it is desired to insert the roof in the said spider or when it is desired to remove it therefrom, main drive means, and control means actuated by the drive means and operatively connected with the operating means for the roof and the cover for operating the roof and the cover synchronously.

GEORGES AUGUSTE PAULIN.